Nov. 3, 1931.  R. WORK  1,830,499
DISTRIBUTING APPARATUS
Filed Oct. 10, 1929
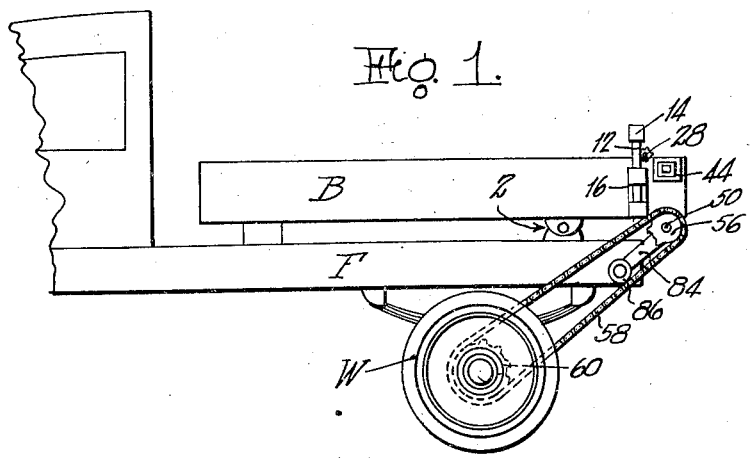
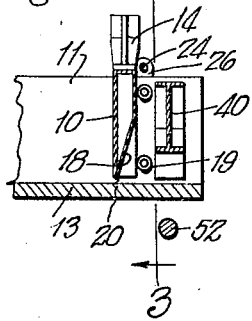
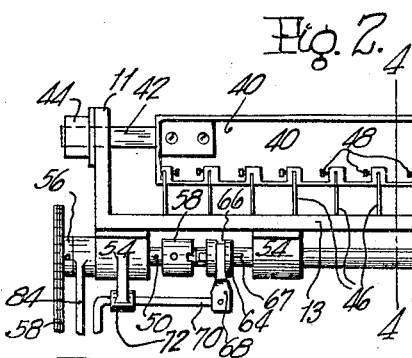
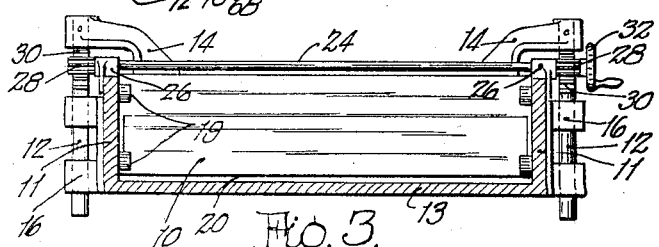
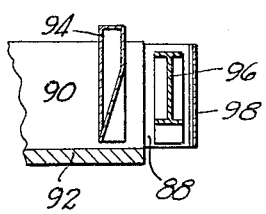
INVENTOR.
Ransom Work
BY Arthur C Ross
his ATTORNEY.

Patented Nov. 3, 1931

1,830,499

UNITED STATES PATENT OFFICE

RANSOM WORK, OF SPRINGFIELD, MASSACHUSETTS

DISTRIBUTING APPARATUS

Application filed October 10, 1929. Serial No. 398,791.

This invention relates to improvements in apparatus for distributing material on to a roadway or the like.

The principal objects of the invention are to provide an apparatus of the class described which is adapted for use with a vehicle and may be operated by a movement thereof all to the end that efficiency in operation may result.

The invention in the form at present preferred will be described in connection with the accompanying drawings, in which Fig. 1 is a partial side elevational view of a vehicle provided with a dump body with the structure of the invention associated therewith.

Fig. 2 is an end elevational view of the apparatus of the invention.

Fig. 3 is a sectional elevational view on the line 3—3 of Fig. 4.

Fig. 4 is a sectional elevational view in the line 4—4 of Fig. 2, and

Fig. 5 is a view similar to Fig. 4 showing a modified form of the invention.

Referring to the drawings in detail, the invention will now be described.

F and B designate a frame and dump body of a vehicle which may be a motor truck dump, so-called. The body is adapted for carrying sand or the like and is hinged to the frame as at 2 so that it may be tipped or tilted to a dumping position wherein its rear end is lowered by elevating its forward end in the usual way. The frame is of course supported in rear wheels such as is indicated by W and which are mounted on and driven by an axle in the usual way.

According to the apparatus of the invention, I provide means associated with the rear end of the body for distributing sand or the like from the body as the truck moves along the roadway. The sand is discharged therefrom onto the roadway in an even manner and in such an amount as may be desired. This will now be described.

A gate 10 is provided which extends transversely of the body between side walls 11 thereof and is supported for an up and down movement on rods 12 which are connected thereto by brackets 14 and which are slidable in bearings 16 fixed to the outer sides of the walls of the body. This gate is preferably provided with an inclined outer wall or side 18 as shown so as to form a comparatively narrow lower edge 20. This edge co-operates with a lower wall 13 of the body to form a passageway to permit sand or the like to flow therethrough, especially when the body is moved to a tilted position. By being movable the passageway may be varied in width so as to thereby vary the amount of sand which is allowed to flow therepast. Rolls 19 mounted on the side walls 11 are provided for the gate to bear against and allow it to move up and down for the purpose described and then support the same against the weight of material in the body behind at the other side of the gate.

A rotatable shaft 24 journalled in bearings 26 fixed to the walls 11 has fixed thereto a pair of pinions 28. The pinions mesh with teeth 30 provided on the rods 12 and a hand wheel 32 fixed to the shaft facilitates the turning of the shaft 24 whereby the gate may be raised or lowered. Obviously, the shaft may be operated at a distance therefrom by the provision of any suitable means such as a chain and sprocket arrangement.

A distributor bar 40 is mounted rearwardly of the gate for transverse movements between the walls of the body. It is supported by square rods 42 fixed thereto which slide in bearings 44 fixed to the side walls 11 and carries a plurality of distributer blades 46. These may be inserted in suitable slots and clamped therein by screws 48 in threaded engagement with the bar. The lower ends of the blades are arranged to pass over the lower wall of the body and as the bar 40 reciprocates they act to throw sand from the lower wall 13 of the body.

The bar is reciprocated in the following manner: Shafts 50 and 52 are rotatable in bearings 54 fixed to the underside of the body and are in axial alignment. The shaft 50 has fixed to its outer end a sprocket 56 and to its inner ends a slotted clutch member 58. The sprocket 56 is in engagement with an endless chain 58 which is also in turn in engagement with a sprocket 60 associated with a rotating part of the vehicle such as the wheel W. With this arrangement the shaft 50 is rotated by the wheel as the vehicle moves along the roadway. A toothed clutch member 64 is slidable on the inner end of the shaft 52, and is held against rotation thereon by a key 67 of the shaft. As the member 64 is moved to the left into engagement with the member 58 the shaft 52 may be rotated by the shaft 50. The member 64 is provided with a circumferential slot or groove 66 which receives a fork member 68 of ordinary form fixed to a shifting rod 70. The rod is slidable in a bearing 72 depending from the bracket 54 and as it is moved in one direction or the other the member 64 is moved into and out of clutching engagement with the clutch member 58.

An arm 76 fixed to rod 42 at the right hand end of the distributer carries a roll 78 which rides in a cam groove 80 of a cam fixed to shaft 52 so that as the shaft 52 is rotated the cam will move the arm 76 and distributer 40 back and forth.

It will be readily obvious that the cam may be arranged to move the distributer back and forth at any desired frequency while the sprockets and chain drive for the rotating shaft may be varied within wide limits to co-operate with the cam for any desired movements of the distributer.

In operation with the body filled with sand or the like, it may be tilted to any desired angle so that the material will flow towards the rear end. The gate is adjusted by turning shaft 24 to allow the desired amount of material to flow thereunder. The shafts 50 and 52 are clutched together and as the vehicle moves along the roadway the distributer will be reciprocated back and forth so that the blades thereof will discharge material from off the bottom of the body and outwardly onto the roadway.

The material in this way is discharged to provide a layer of uniform thickness on the roadway which may be varied by varying the width of the passageway formed between the lower edge of the gate and lower wall of the body.

A tension arm 84 is loosely mounted on shaft 50 and carries on its lower end a roll 86 which bears on the chain 58. The weight of the arm tends to tension the chain since the roll bears thereon at all times either when the body is in the non-tilted position shown or in a tilted position wherein the chain slackens somewhat.

According to the form of the invention shown in Fig. 5 a plate or plates such as 88 may extend from side walls 90 of a body between which a distributer 96 may reciprocate. With this arrangement the distributer blades are beyond the end of the lower wall of the body. A gate 94 may in this form of the invention be located between the side walls inside their ends and an outer plate 98 may extend across between the plates 88.

As the body is tilted material may pass beneath the gate and off the lower wall of the body and the distributer blades will act to distribute the same in the manner desired.

Having described the invention, what I desire to claim and secure by Letters Patent of the United States is:

1. The combination with a vehicle having a rotatable driving element and a tiltable body provided with side and lower walls of means for discharging material from the end of said body comprising, a vertically disposed gate between said side walls movable towards and away from said lower wall, a distributer of less length than the distance between said side walls reciprocable back and forth therebetween, having a plurality of blades depending from the lower side thereof disposed adjacent the marginal edge of the lower wall, means for moving said gate and connections between said driving element and said distributer whereby the latter is operated by the former.

2. The combination with a vehicle having a rotatable driving element and a tiltable body provided with side and lower walls of means for discharging material from the end of said body comprising, a vertically disposed gate between said side walls movable towards and away from said lower wall, a distributer having spaced blades depending from the lower side thereof, the said distributer being reciprocable transversely of said body and being disposed so that said blades are disposed beyond the marginal edge of said lower wall, a rotatable driving shaft and driving connections between said driving element and said shaft and means associated with said shaft and said distributer whereby the latter is reciprocated by the rotation of the former.

3. The combination with a vehicle having a rotatable driving element and a tiltable body provided with side and lower walls of means for discharging material from the end of said body comprising, a vertically disposed gate between said side walls movable towards and away from side lower wall, a distributer having portions guided in said side walls for reciprocation and provided with a plurality of spaced blades on its lower side for acting on material passing below said gate on said lower wall, a rotatable shaft, driving connections between said driving element and said shaft, a cam on said shaft and a member on said distributer for engaging said cam whereby the former is operated by rotation of the latter, the said distributer and blades being located adjacent the marginal edge of said lower wall whereby material on said lower wall will be thrown outwardly by the blades as the distributer reciprocates.

In testimony whereof I affix my signature.

RANSOM WORK.